(12) United States Patent
Jung

(10) Patent No.: US 7,995,435 B2
(45) Date of Patent: Aug. 9, 2011

(54) METHOD AND APPARATUS FOR RECORDING DATA ON OPTICAL DISC

(75) Inventor: Man Young Jung, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 896 days.

(21) Appl. No.: 11/843,512

(22) Filed: Aug. 22, 2007

(65) Prior Publication Data

US 2008/0095025 A1    Apr. 24, 2008

(30) Foreign Application Priority Data

Oct. 20, 2006 (KR) .......................... 10-2006-0102145

(51) Int. Cl.
*G11B 7/00* (2006.01)
(52) U.S. Cl. ............................ 369/47.53; 369/47.32
(58) Field of Classification Search ............... 369/47.53, 369/47.52, 47.32
See application file for complete search history.

(56) References Cited

U.S. PATENT DOCUMENTS

| 5,237,553 | A | * | 8/1993 | Fukushima et al. | ........ 369/53.17 |
| 7,313,062 | B2 | * | 12/2007 | Kobayashi | ................... 369/47.1 |
| 2005/0083740 | A1 | * | 4/2005 | Kobayashi | ................... 365/200 |
| 2005/0213947 | A1 | | 9/2005 | Iwamoto | |

FOREIGN PATENT DOCUMENTS

| JP | 2005-276286 A | 10/2005 |
| JP | 2006-134420 A | 5/2006 |

* cited by examiner

*Primary Examiner* — Adam R. Giesy
(74) *Attorney, Agent, or Firm* — Birch, Stewart, Kolasch & Birch, LLP

(57) ABSTRACT

An apparatus and method for recording data on an optical disc, are discussed. In an embodiment of the present invention, when recording of real-time input data in a high quality mode is requested, an Optimum Power Control (OPC) operation for recording is performed while input data is encoded in a quality mode, which is downwardly adjusted, for example, to a standard quality mode, and is then buffered in a buffer memory. After the OPC operation has been completed, the buffered data is recorded on the optical disc while the data is encoded in the requested high quality mode and is then buffered. Further, the input data is encoded in the requested high quality mode, but may be buffered in a hard disc, rather than the buffer memory, during the performance of the OPC operation.

6 Claims, 6 Drawing Sheets

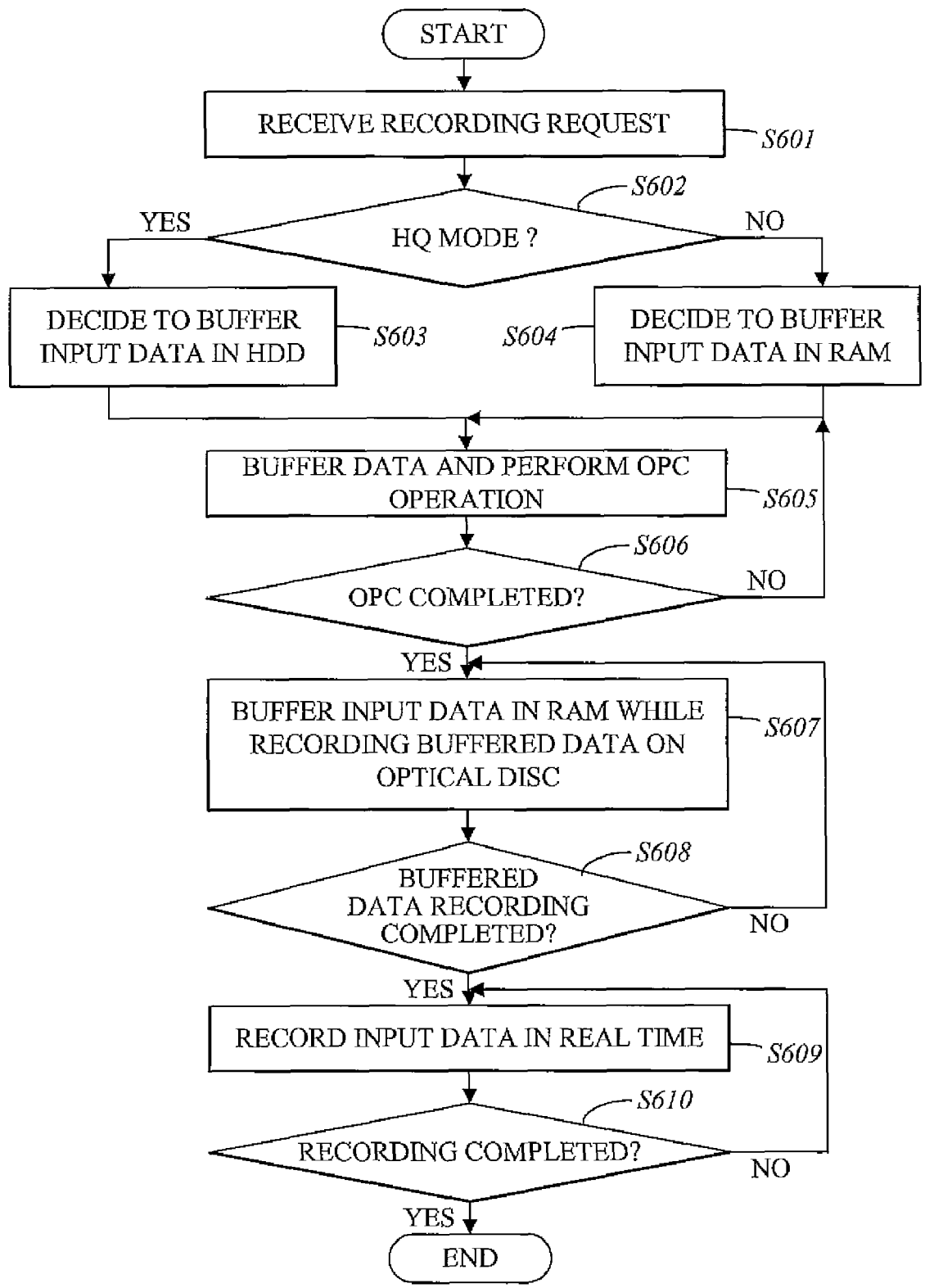

METHOD AND APPARATUS FOR RECORDING DATA ON OPTICAL DISC

This application claims the priority benefit of the Korean Patent Application No. 10-2006-102145 filed on Oct. 20, 2006, which is hereby incorporated by reference.

BACKGROUND OF THE INVENTION

1. Field of the Invention

The present invention relates, in general, to a method and apparatus for recording data on an optical disc.

2. Description of the Related Art

Recently, an optical disc, on which video data having high image quality and audio data having high sound quality can be recorded, for example, a write-once Digital Versatile Disc (for example: DVD-R), or a rewritable DVD (for example: DVD-RW), and an optical disc device capable of recording/reproducing data on/from such an optical disc, have been widely popularized.

When data is recorded on an optical disc, an optical disc device accesses a predetermined area in the optical disc, for example, a Power Calibration Area (PCA), and performs an Optimum Power Control (OPC) operation, thus detecting the optimum recording power for recording.

When the recording speed requested by a user is, for example, ×4 speed, the optical disc device detects the optical power value suitable for ×4 speed-recording by accessing an inner PCA and performing an OPC operation at ×4 speed.

Further, when the recording speed requested by a user is faster than ×4 speed, for example, ×16 speed, the optical disc device detects an optical power value suitable for ×4 speed-recording by performing an OPC operation in an inner PCA, and thus detects an optical power value suitable for ×16 speed-recording by accessing an outer PCA and performing an OPC operation at ×16 speed, as shown in FIG. 1.

Thereafter, the optical disc device calculates an optical power value suitable for each recording speed or a current recording position (diameter) using the optical power values suitable for ×4 speed and ×16 speed, which are detected through the OPC operations performed in the inner PCA and the outer PCA, and thus performs a data recording operation using the optical power value.

Meanwhile, when the user of an optical disc device requests the recording of an external input signal or a broadcasting signal, the optical disc device first performs an OPC operation. Input data or the data encoded by a Moving Picture Experts Group (MPEG) encoder is temporarily stored in buffer memory, such as Random Access Memory (RAM) provided in the device, during the performance of the OPC operation.

In this case, the required capacity of the RAM is proportional to the time required to perform an OPC operation and recording resolution for data, and thus large-capacity RAM is required when the time required for the OPC operation is long or when the resolution of the data to be recorded is of High Quality (HQ). For example, RAM having a 64 MB or larger capacity must be used to buffer all High Quality (HQ) data for the period of about 6 seconds, which is the time required to perform the OPC operation.

Then, since RAM is relatively expensive, there occurs a problem in that, when large-capacity RAM is used, the cost of manufacturing the optical disc device inevitably increases, and thus it becomes difficult to reduce the manufacturing cost associated with the optical disc device.

SUMMARY OF THE INVENTION

Accordingly, the present invention has been made keeping in mind the above and other problems occurring in the related art, and an object of the present invention is to provide a method and device for buffering all data input during the performance of an OPC operation in RAM having a relatively small capacity.

In accordance with one aspect of the present invention to accomplish the above and other objects, there is provided a method of recording data on an optical disc, comprising performing an optimum recording power control operation while encoding input data at quality that is downwardly adjusted and buffering the encoded data when recording of real-time input data in a high quality mode is requested; and recording buffered data on the optical disc while encoding the input data in the requested high quality mode and buffering the encoded data when the optimum recording power control operation has been completed.

In accordance with another aspect of the present invention to accomplish the above and other objects, there is provided a method of recording data on an optical disc, comprising performing an optimum recording power control operation when a recordable optical disc is inserted in a state in which a recording mode is set to a high quality mode; and encoding input data and recording the encoded data on the optical disc without performing the optimum recording power control operation if recording of real-time input data is requested.

In accordance with a further aspect of the present invention to accomplish the above and other objects, there is provided a method of recording data on an optical disc, comprising performing an optimum recording power control operation while encoding input data in a high quality mode and buffering the encoded data in a first medium having a large capacity, other than the optical disc, if recording of real-time input data on the optical disc in the high quality mode is requested; and recording data buttered in the first medium on the optical disc while encoding input data in the high quality mode and buffering the encoded data in a second medium, having a small capacity, other than the optical disc, when the optimum recording power control operation has been completed.

In accordance with yet another aspect of the present invention to accomplish the above and other objects, there is provided a method of recording data on an optical disc, comprising determining, in accordance with a requested recording mode, a quality at which data, input while performing an optimum recording power control operation, is to be encoded if recording of real-time input data is requested; and performing an optimum recording power control operation while encoding input data at the determined quality and buffering the encoded data.

In accordance with still another aspect of the present invention to accomplish the above and other objects, there is provided a method of recording data on an optical disc, comprising determining, in accordance with a preset recording mode, whether to perform an optimum recording power control operation in advance when a recordable optical disc is inserted; and performing the optimum recording power control operation in advance or after recording is requested in response to a result of the determination.

In accordance with still another aspect of the present invention to accomplish the above and other objects, there is provided a method of recording data on an optical disc, comprising determining, in accordance with a requested recording mode, a medium in which data, input during performance of an optimum recording power control operation, is to be buffered, when recording of real-time input data on the optical disc is requested; and performing an optimum recording power control operation while encoding the input data in the requested recording mode and buffering the encoded data in the determined medium.

In accordance with still another aspect of the present invention to accomplish the above and other objects, there is provided an apparatus for recording data on an optical disc, comprising a recording unit for performing an optimum recording power control operation on the optical disc, encoding input data, and recording the encoded data on the optical disc; first and second media for selectively buffering the data encoded during performance of the optimum recording power control operation; and a control unit for determining, in accordance with a requested recording mode, a medium in which data, input during performance of an optimum recording power control operation, is to be buffered when recording of real-time input data on the optical disc is requested, and for controlling the recording unit so that the optimum recording power control operation is performed while the input data is encoded in the requested recording mode and the encoded data is buffered in the determined medium.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which:

FIG. 6 is a flowchart showing the operations of a method of recording data on an optical disc according to a third embodiment of the present invention.

DETAILED DESCRIPTION OF PREFERRED EMBODIMENTS

Hereinafter, embodiments of an apparatus and method for recording data on an optical disc according to the present invention will be described in detail with reference to the attached drawings.

The method of recording data on an optical disc according to the present invention can be applied to various types of optical disc recording apparatuses, such as a Digital Versatile Disc (DVD) recorder/player.

Figure 1:
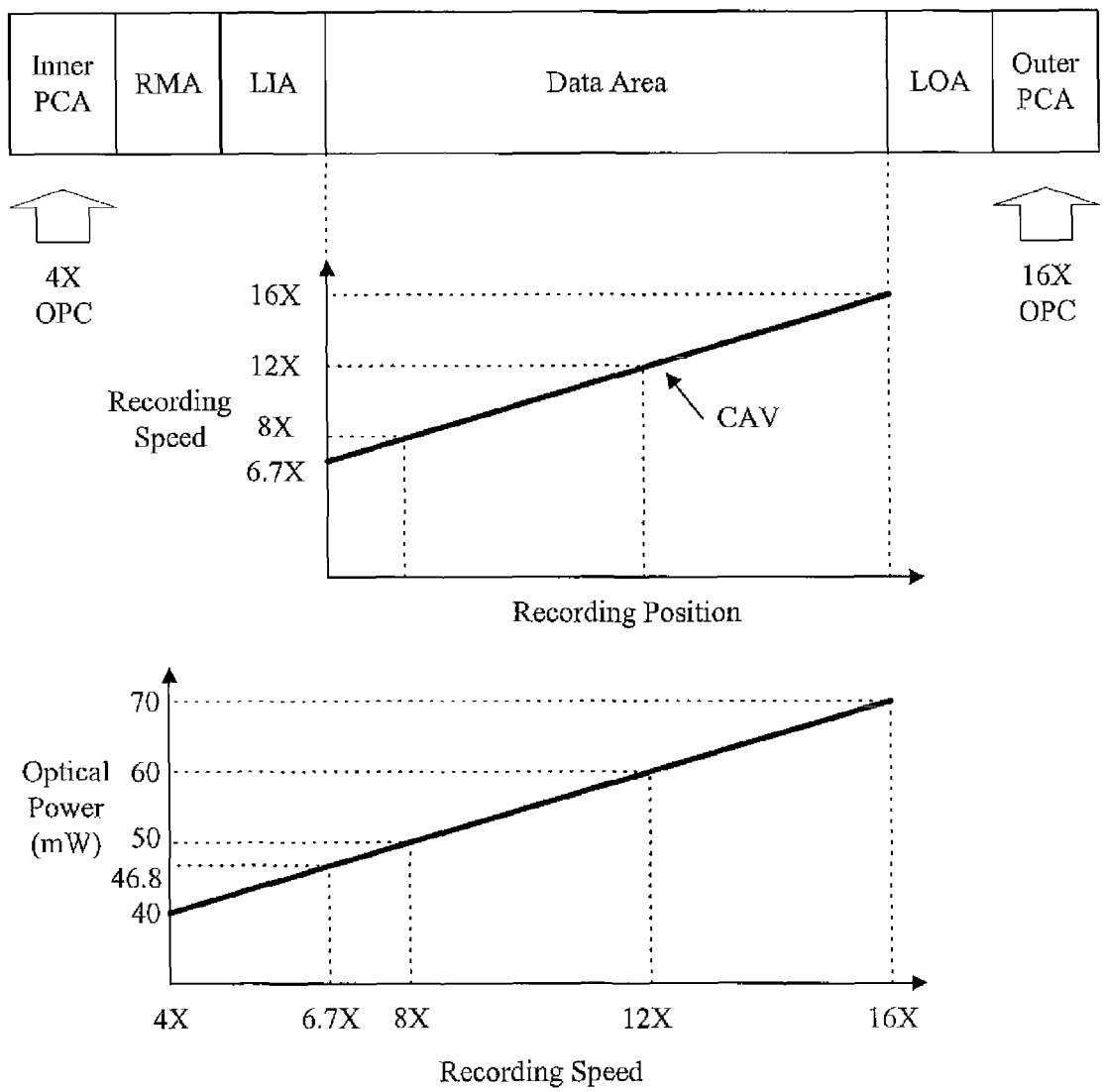
FIG. 1 is a diagram showing an Optimum Power Control (OPC) operation according to a related art.
Figure 2:
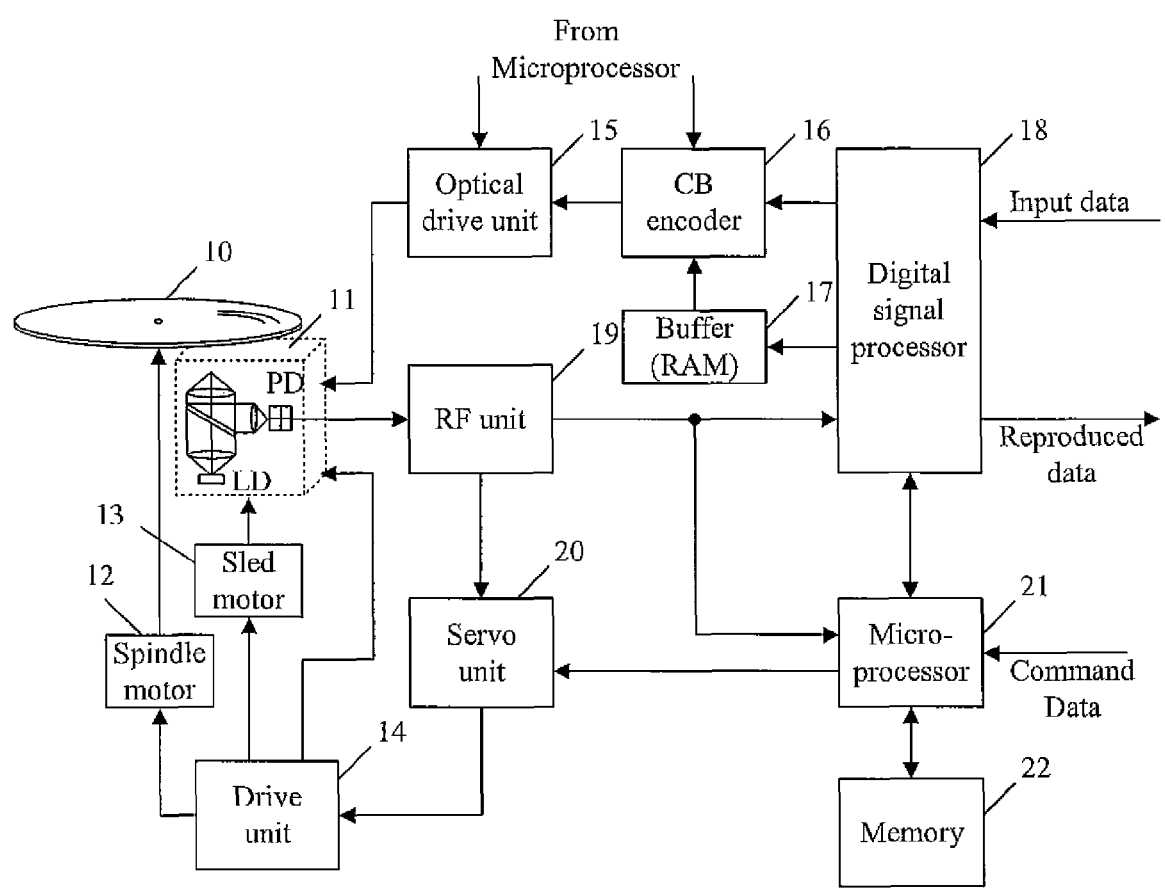
FIG. 2 is a diagram showing the construction of an optical disc recording apparatus according to an embodiment of the present invention.

FIG. 2 is a diagram showing one example of the construction of an optical disc recording apparatus to which the present invention is applied.

The optical disc recording apparatus includes an optical pickup 11, a spindle motor 12, a sled motor 13, a drive unit 14, an optical drive unit 15, a Channel Bit (CB) encoder 16, a buffer memory 17, a digital signal processor 18, a Radio Frequency (RF) unit 19, a servo unit 20, a microprocessor 21, and a memory 22. All components of the apparatus are operatively coupled and configured.

The buffer memory 17 can be implemented using a volatile memory, such as Random Access Memory (RAM), and is adapted to buffer the data that are MPEG-encoded by the digital signal processor 18 during the performance of an Optimum Power Control (OPC) operation. RAM having a capacity sufficient to buffer all of the data encoded by the digital signal processor 18 at Standard Quality (SQ) for the time required to perform the OPC operation is used as the buffer memory 17.

If the recording of real-time input data is requested by a user, the microprocessor 21 controls the optical drive unit 15, thereby performing the OPC operation. In this case, if a current recording mode is set to a High Quality (HQ) mode, the microprocessor 21 controls the digital signal processor 18, thereby adjusting the resolution of encoded data downwardly from HQ to SQ and buffering the encoded data in the buffer memory 17.

Further, when the OPC operation has been completed, the microprocessor 21 records the standard quality data, buffered in the buffer memory 17, on an optical disc 10, encodes subsequently input data at high quality, and thus records the encoded data on the optical disc. This procedure is described in detail below.

Figure 3:
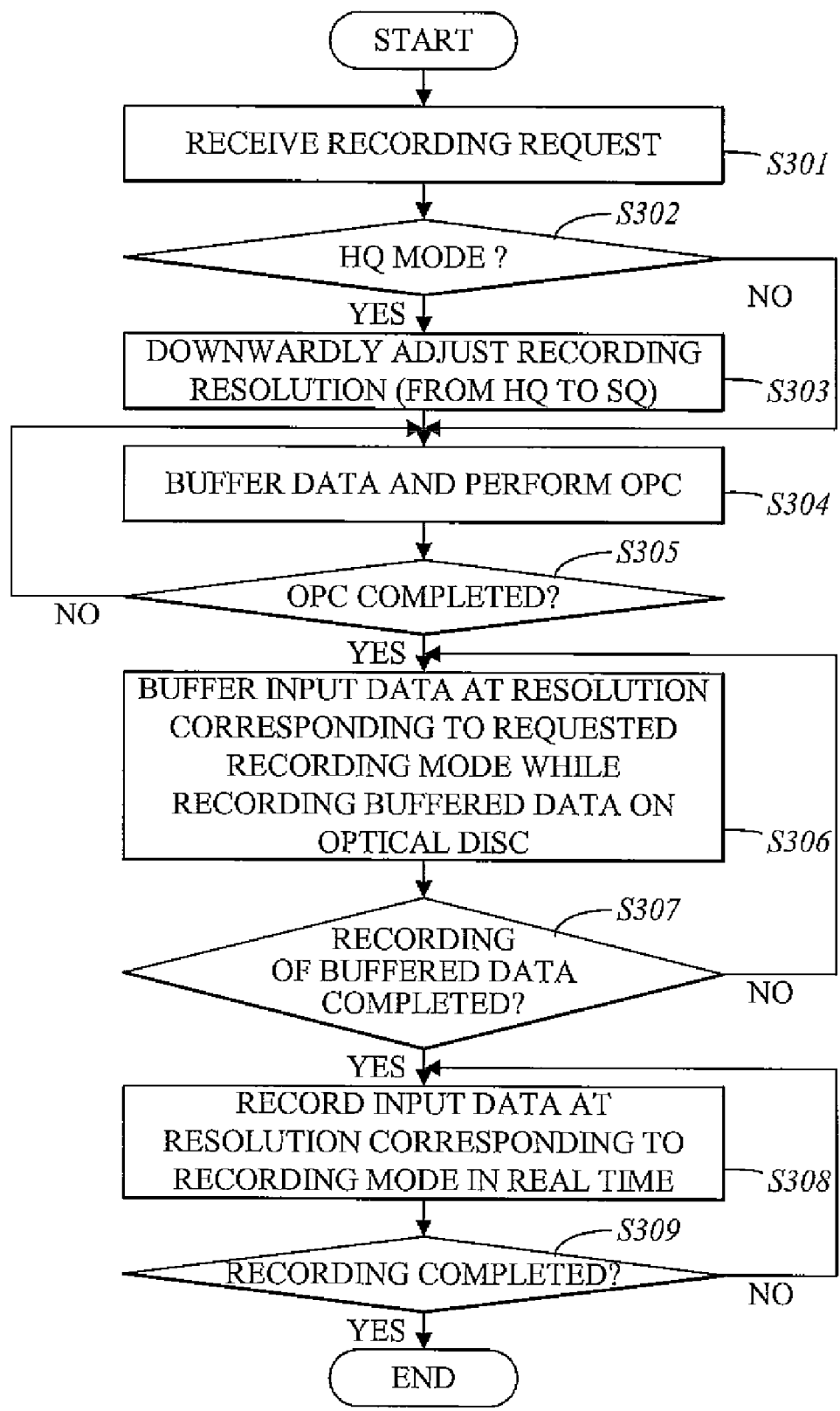
FIG. 3 is a flowchart showing the operations of a method of recording data on an optical disc according to a first embodiment of the present invention.

FIG. 3 is a flowchart showing the operations of a method of recording data on an optical disc according to a first embodiment of the present invention. The methods in this and other embodiments can be implemented by the apparatus of FIG. 2 and/or FIG. 5 or by other suitable device.

Referring to FIG. 3, when the recording of real-time input data is requested by the user through the manipulation of key(s) at step S301, the microprocessor 21 checks a current recording mode, and downwardly adjusts the recording mode for the input data from HQ to SQ at step S303 if the current recording mode is set to the HQ mode at step S302.

The microprocessor 21 controls the optical drive unit 15 so that an OPC operation is performed while controlling the digital signal processor 18 so that the resolution of the input data is adjusted downwards to SQ, the input data is encoded at SQ, and the SQ-encoded data is buffered in the buffer memory 17 at step S304.

Further, when the OPC operation has been completed at step S305, the microprocessor 21 controls the digital signal processor 18 so that input data is encoded at the resolution corresponding to the original recording mode and the encoded data is buffered in the buffer memory 17 while controlling both the channel bit encoder 16 and the optical drive unit 15 so that the standard quality data, buffered in the buffer memory 17, is recorded on the optical disc 10 at step S306.

Thereafter, if all of the data buffered in the buffer memory 17 has been recorded at step S307, the microprocessor 21 controls the digital signal processor 18, the channel bit encoder 16, and the optical drive unit 15, thereby encoding the input data in an original recording mode, and recording the encoded data on the optical disc 10 in real time at step S308. This recording operation is repeated until the recording of all of the input data is completed at step S309. In other words, once all the stored input data in the buffer memory 17 has been read out and then recorded on the disc 10, then the input data recording is continued by returning to data currently input to the apparatus and then recording the currently input data onto the disc 10.

For stable recording, even after all of the data buffered during the performance of the OPC operation and the data buffered until a predetermined time has elapsed from the time point at which the OPC operation was completed has been recorded, the microprocessor 21 may buffer encoded data in the buffer memory 17 and may then record the data buffered in the buffer memory 17 on the optical disc 10, rather than directly recording the encoded data on the optical disc 10.

Meanwhile, when the current recording mode is not set to an HQ mode, for example, when the current recording mode is set to an SQ mode or a Low Quality (LQ) mode, the microprocessor 21 omits step S303 of downwardly adjusting the recording mode for input data.

That is, when the current recording mode is an SQ or LQ mode, the digital signal processor 18 encodes input data in the SQ mode or LQ mode, which is the current recording mode, and buffers the encoded input data in the buffer memory 17, and, simultaneously, the optical drive unit 15 performs the OPC operation. After the OPC operation has been completed, the microprocessor 21 encodes the input data in the current recording mode, and records the encoded input data in real time on the disc.

Since the input data is adjusted downwards to SQ, and is buffered while the OPC operation is performed, for example, for about 6 seconds, all of the input data can be normally buffered in RAM having a small capacity during the performance of the OPC operation.

Further, when the OPC operation has been completed, the input data (data input to the digital signal processor 18) is encoded in the HQ mode, which is the original recording mode, and is then recorded on the disc. Accordingly, when the recorded data is reproduced, the data is temporarily reproduced at Standard Quality (SQ) for an initial period of time, and can be reproduced at High Quality (HQ) after the period corresponding to the OPC operation has elapsed.

Figure 4:
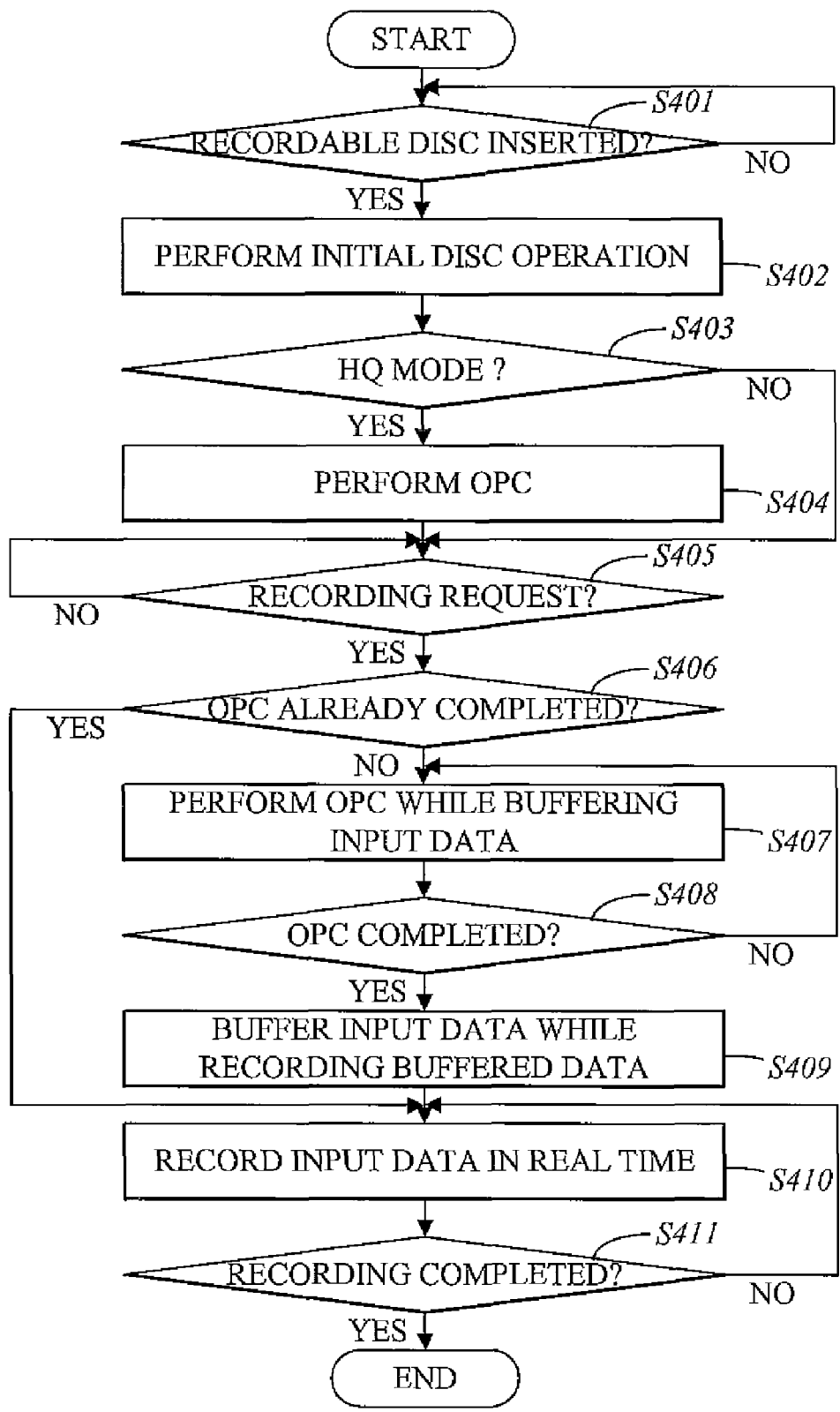
FIG. 4 is a flowchart showing the operations of a method of recording data on an optical disc according to a second embodiment of the present invention.

FIG. 4 is a flowchart showing the operations of a method of recording data on an optical disc according to a second embodiment of the present invention.

When a recordable optical disc is inserted into the optical disc recording apparatus of FIG. 2 at step S401, the microprocessor 21 of the apparatus controls both the servo unit 20 and the optical drive unit 15, thereby performing an initial disc operation of reading navigation information recorded on the optical disc 10, and loading the read navigation information into the memory 22 at step S402.

The microprocessor 21 determines whether a current recording mode is set to a High Quality (HQ) mode at step S403. If the current recording mode is set to the HQ mode at step S403, the microprocessor 21 controls the optical drive unit 15, thereby performing an OPC operation at step S404. In contrast, if the HQ mode is not set at step S403, no OPC operation is performed.

Further, when the recording of real-time input data is requested by the user through the manipulation of key(s) at step S405, the microprocessor 21 determines whether the OPC operation was already completed before the recording request at step S406. If it is determined that the OPC operation has already been completed, the microprocessor 21 encodes the input data and directly records the encoded data on the optical disc 10 in real time, or records the encoded data on the optical disc 10 via the buffer memory 17, without additionally performing a separate OPC operation at step S410.

In contrast, if it is determined that no OPC operation has already been completed, the microprocessor 21 performs an OPC operation while encoding the input data and storing the encoded data in the buffer memory 17 at step S407. This step S407 is repeated until the OPC operation is completed at step S408. Since the input data is encoded at SQ or LQ during the performance of the OPC operation, all of the input data can be buffered in, for example, a small-capacity RAM having a capacity of 32 MB.

Further, if the OPC operation has been completed at step S408, the microprocessor 21 encodes the input data in an SQ mode or an LQ mode, which is a recording mode set in the apparatus, and buffers the encoded input data in the buffer memory 17 while recording the input data buffered in the buffer memory 17 on the optical disc 10 at step S409. Step S409 is repeated until all of the data buffered in the buffer memory 17 is recorded onto the disc 10.

Generally, since the speed at which data is recorded on an optical disc is much higher than the speed at which data is input in real time to such an extent that the data recording speed may be at least several times as high as the data input speed, data that is newly input during the recording of data on the optical disc, as well as the data buffered in the buffer memory during the performance of the OPC operation, can be immediately recorded on the optical disc.

Thereafter, the microprocessor 21 encodes the input data and directly records the encoded data on the optical disc 10, or records the encoded data on the optical disc 10 via the buffer memory 17 at step S410. That is, once all the input data stored in the buffer memory 17 has been recorded on the disc, then the input data recording is continued by resuming the recording of data input to the processor 18 onto the disc 10.

Therefore, when the recording mode is set to a high quality mode, it is determined if the OPC operation has already been performed before the recording of real-time input data is requested. If so, no additional OPC operation is performed, and there is no need to separately buffer input data during the performance of the OPC operation, and thus RAM having a large capacity for storing high quality data is not required.

Figure 5:
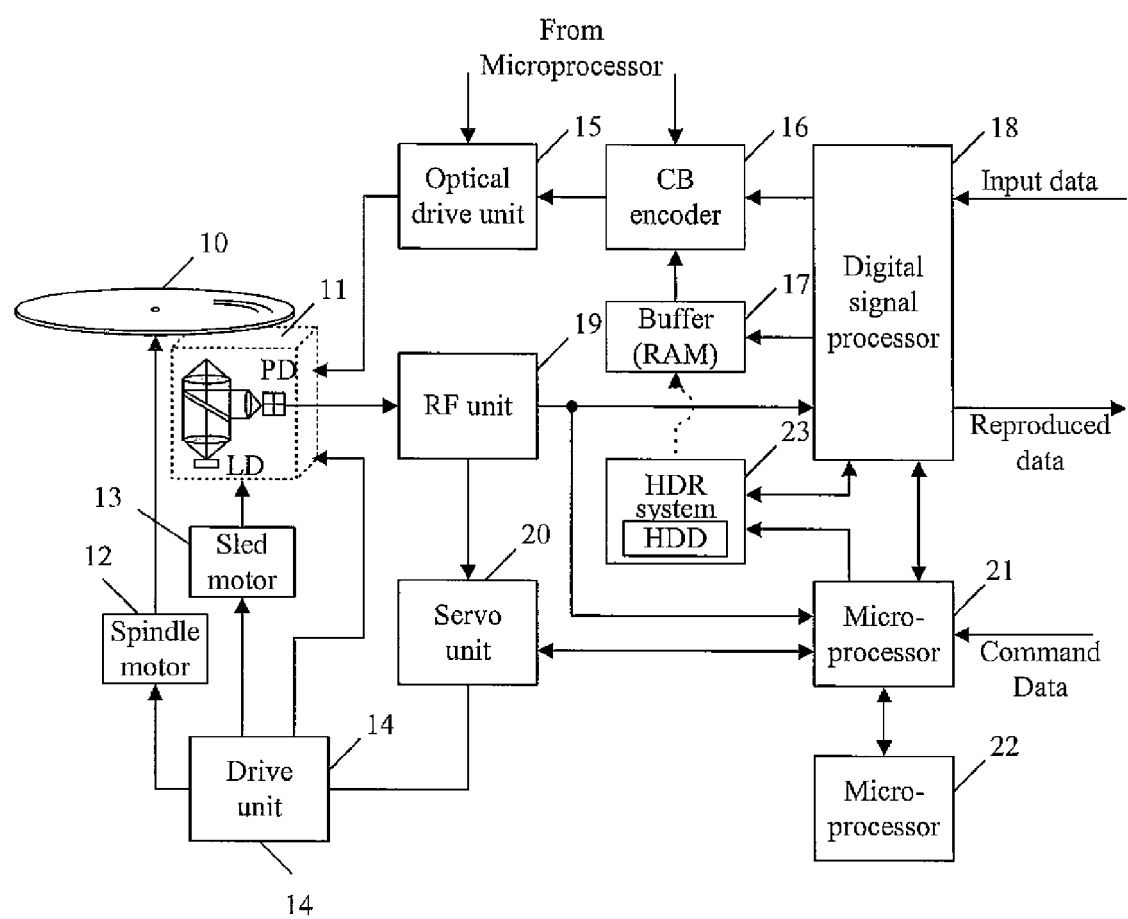
FIG. 5 is a diagram showing the construction of an apparatus for recording data on an optical disc according to another embodiment of the present invention.

FIG. 5 is a diagram showing the construction of an optical disc recording apparatus according to another embodiment of the present invention. The optical disc recording apparatus of FIG. 5 is constructed to further include a Hard Disc Recording (HDR) system 23 in the optical disc recording apparatus of FIG. 2.

Similar to FIG. 2, a buffer memory 17 is implemented using a RAM having a capacity sufficient to buffer all of the data encoded by a digital signal processor 18 at Standard Quality (SQ) for the time required to perform an OPC operation.

Further, when the recording of real-time input data is requested, a microprocessor 21 controls an optical drive unit 15, thereby performing the OPC operation. When a current recording mode is set to a High Quality (HQ) mode, the microprocessor 21 controls the HDR system 23, thereby buffering high quality and large size data, which is encoded by the digital signal processor 18, in a hard disc provided in the HDR system 23.

Further, when the OPC operation has been completed, the microprocessor 21 reads the high quality data buffered in the hard disc, records the read data on the optical disc 10, encodes subsequently input data at high quality, and records the encoded data. This procedure is described in detail below.

FIG. 6 is a flowchart showing the operations of a method of recording data on an optical disc according to a third embodiment of the present invention.

When the recording of real-time input data is requested by the user through the manipulation of key(s) at step S601, the microprocessor 21 in FIG. 5 checks a current recording mode. When the current recording mode is set to a High Quality (HQ) mode at step S602, the microprocessor 21 decides to buffer input data or encoded data in the hard disc provided in the HDR system 23 at step S603.

In contrast, when the current recording mode is not set to the HQ mode, for example, when the current recording mode is a Standard Quality (SQ) or Low Quality (LQ) mode, the microprocessor 21 decides to buffer the data encoded in the SQ or LQ mode, in the buffer memory 17 having a small capacity at step S604.

Further, the microprocessor 21 controls the optical drive unit 15 so that the OPC operation is performed while controlling the digital signal processor 18 so that input data is encoded in the currently set recording mode and the encoded data is buffered in the hard disc or buffer memory 17 at step S605.

Thereafter, when the OPC operation has been completed at step S606, the microprocessor 21 controls the digital signal processor 18 so that the input data is encoded in the currently set recording mode and the encoded data is buffered in the buffer memory 17 while controlling both the channel bit encoder 16 and the optical drive unit 15 so that the buffered data is read and recorded on the optical disc 10 at step S607.

For example, when the current recording mode is set to an HQ mode, the microprocessor 21 controls the HDR system 23, thereby reading the high quality data buffered in the hard disc, and recording the read data on the optical disc 10. In contrast, when the current recording mode is set to an SQ or LQ mode, the microprocessor 21 reads the standard quality data or low quality data buffered in the buffer memory 17, and records the read data on the optical disc 10.

When all of the data buffered in the hard disc or the buffer memory 17 has been recorded at step S608, the microprocessor 21 controls the digital signal processor 18, the channel bit encoder 16, and the optical drive unit 15, thereby encoding the current input data in the currently set recording mode and directly recording the encoded data on the optical disc 10, or recording the encoded data on the optical disc 10 via the buffer memory 17 at step S609. This recording operation is repeated until the recording of the input data is completed at step S610.

Therefore, when the recording mode is set to a High Quality (HQ) mode, the high quality data that is input and encoded during the performance of the OPC operation, for example, for about 6 seconds, is buffered in the hard disc. When the recording mode is set to an SQ mode or LQ mode, all of the standard quality data or low quality data that is input and encoded during the performance of the OPC operation can be normally buffered in RAM having a capacity as low as 32 MB.

Accordingly, the present invention is advantageous in that an optical disc recording apparatus can be simplified and the manufacturing cost thereof can be greatly reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of recording data on an optical disc, comprising:
    performing an optimum recording power control operation while encoding input data at quality that is downwardly adjusted and buffering the encoded data in a buffer memory of an optical disc recording apparatus, when recording of real-time input data in a high quality mode is requested; and
    recording the buffered data on the optical disc while encoding input data in the requested high quality mode, when the optimum recording power control operation has been completed.

2. The method according to claim 1, further comprising:
    directly recording the input data encoded in the high quality mode on the optical disc without buffering, if all of the buffered data has been recorded.

3. The method according to claim 1, further comprising:
    buffering the input data encoded in the high quality mode, and
    recording the buffered input data.

4. A method of recording data on an optical disc, comprising:
    determining, in accordance with a requested recording mode, a quality at which data, input while performing an optimum recording power control operation, is to be encoded if recording of real-time input data is requested; and
    performing an optimum recording power control operation while encoding the input data at the determined quality and buffering the encoded data in a buffer memory of an optical disc recording apparatus.

5. The method according to claim 4, wherein, if recording of input data in a high quality mode is requested, the input data is encoded at a quality lower than that of the high quality mode during performance of the optimum recording power control operation, and is then encoded in the high quality mode after the optimum recording power control operation has been completed.

6. The method according to claim 4, wherein, if recording of input data in a quality mode equal to or lower than a standard quality mode is requested, the input data is encoded in the requested quality mode during performance of the optimum recording power control operation.

* * * * *